Oct. 18, 1966     J. OGDEN ETAL     3,279,284

METHOD OF MAKING SPINNERETTES

Filed Jan. 8, 1964

INVENTORS
JOSEPH OGDEN
EDWARD G. BALCENIK

BY *John G. Kovalich*

AGENT

3,279,284
METHOD OF MAKING SPINNERETTES
Joseph Ogden, Maywood, and Edward G. Balcenik, Bernardsville, N.J., assignors to Engelhard Industries, Inc., Newark, N.J., a corporation of Delaware
Filed Jan. 8, 1964, Ser. No. 336,446
3 Claims. (Cl. 76—107)

The present invention deals with a method of making spinnerettes and more particularly with a method of making spinnerettes having capillary lengths maintained extremely uniform in the reproduction thereof.

It has been established that the uniformity of yarn composed of extruded synthetic filaments is dependent in part, and among other factors, on the uniformity of spinnerette capillary lengths. Under precision conditions it has been possible to maintain capillary lengths substantially uniform within tolerances of about ±0.001" to about ±0.002". However, even so, in the striving for greater uniformity of yarn, the above-mentioned tolerances represent hurdles still to be overcome in the desire for still greater precision in capillary length uniformity and the consequent greater uniformity of yarn.

In accordance with this invention, it has been recognized that non-uniformity in the reproduction of spinnerette capillary lengths is detrimental to the production of uniform deniers. Consequently, the invention contemplates the fabrication of composite spinnerettes wherein capillary bores are formed through an extrusion plate ground or lapped to precise thickness which is subsequently welded to an appropriately counterbored inlet plate to provide a composite spinnerette of requisite thickness, the welding being accomplished without plastic deformation or dimensional change in the component plates.

It is an object of the invention to provide a method of making a spinnerette having capillary lengths of greater uniformity in the reproduction thereof.

It is the object of the invention to provide a method of making spinnerettes wherein the spinnerette capillary lengths are maintain within tolerances of ±0.0001".

Figure 2:
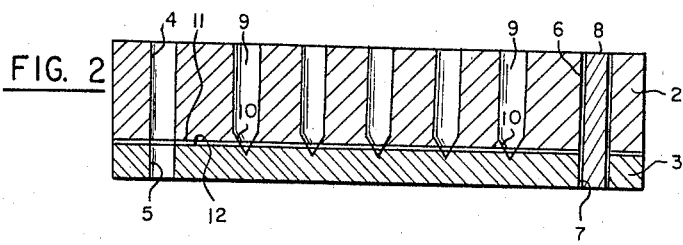
Figure 1:
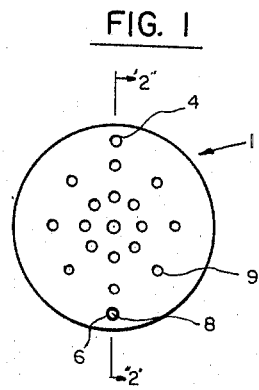
Figure 3:
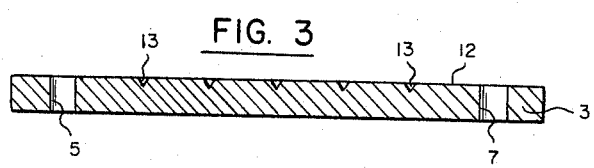
Figure 4:
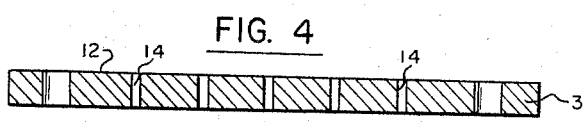
Figure 5:
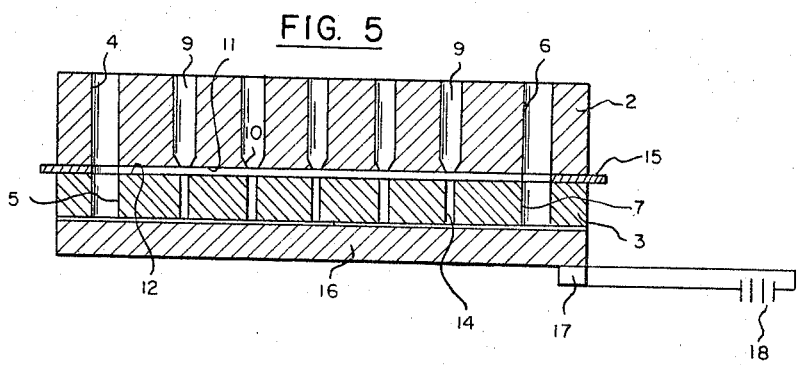
Figure 6:
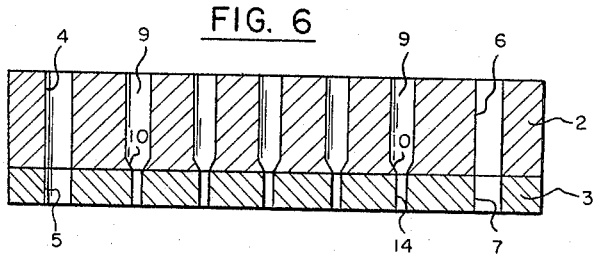

Other objects of the invention will become apparent from the description hereinafter following and the drawings forming a part hereof, in which:

FIGURE 1 is an exaggerated top view showing an early phase assembly in the manufacture of a spinnerette according to the invention, FIGURE 2 is an enlarged cross-sectional view along lines 2—2 of FIGURES 1, FIGURE 3 is a cross-sectional view of a removed bottom plate component of the assembly of FIGURE 1, FIGURE 4 is a cross-sectional view showing as an intermediate phase the provision of capillary bores through the bottom plate of FIGURE 3, FIGURE 5 shows a cross-sectional view of a spinnerette assembly for the welding of the component plates in accordance with the invention, and FIGURE 6 shows a cross-sectional view of the finished spinnerette.

Referring to the figures a circular or plate-like composite spinnerette 1 having, for example, a diameter of about 3½" is provided by positioning preferably clamping an upper circular blank 2 having a thickness of from about 0.062" to about 1.0" on a lower circular blank 3 of corresponding diameter having a thickness of from about 0.007" to about 0.250", and forming a plurality of co-axial bores 4 and 5 and co-axial bores 6 and 7 through the upper and lower blanks adjacent their marginal peripheral regions. Dowel pins are then force-fitted into the plurality of co-axial bores of both blanks in the manner illustrated by the dowel 8 fitted into bores 6 and 7. Having mechanically secured the blanks or plates in such manner, a plurality of cylindrical conically terminated counterbores 9 are formed through the upper surface of the plate 2 with the conical terminal portion 10 passing through the bottom face 11 of the upper plate and providing for the scoring of the upper surface 12 of lower plate 3 to provide center guide means 13 indicating the location of the axis of a cylindrical counterbore 9. The dowels are removed, the plate are separated, and with the score means as a guide, cylindrical capillary bores 14 having a diameter of from about 0.005" to about 0.062" are formed, e.g., by drilling or punching, through the thickness of the bottom plate 3 as shown in FIGURE 3, each in axial alignment with its cooperating cylindrical counterbore 9 in upper plate 2. The bottom plate 3 is then ground or lapped to the prescribed thickness within ±0.0001". Thereafter, the plates 2 and 3 are again re-assembled with the capillaries 14 in co-axial alignment with the counterbores 9 and with a thin shim ring or spacer ring 15, e.g. a split ring, between the plates 2 and 3 and preferably circumscribing the combined dowel bores and the spinnerette holes for establishing a spacing between the plates.

The dowel pins 8 are again fitted into the co-axial bores 4 and 5 and 6 and 7, or the spaced plates 2 and 3 may be otherwise secured, e.g. by clamps. Thereafter the spacer ring is removed leaving the plates supported in spaced relationship by the dowels. Having so re-assembled the plates 2 and 3, a sheet of explosive fabric 16, e.g., a circular flexible sheet explosive of the diameter of the spinnerette assembly, is placed preferably adjacent and in contact with the bottom of the plate 3 with the upper plate under some restraint (not shown). The explosive fabric may be of the type described in U.S. Patent No. 2,703,297. An electrically activated detonator 17 is mounted on the explosive sheet 16 and connected to a source of electrical energy 18. The sheet 16 is then exploded, and the plates 2 and 3 are substantially uniformly impacted over their entire contiguous surfaces under the influence of attendant shock waves whereby the plates 2 and 3 are effectively welded together without substantial plastic deformation or dimensional change of the plates 2 and 3 and in the structural relationship indicated by FIGURE 6.

Specifically, the invention resides in the instantaneous uniform contiguous surface welding which is accomplished without plastic deformation or dimensional change. The term "without plastic deformation" as employed embraces such low degree of plastic deformation substantially less than ±0.0001" of dimensional change. While the method described and illustrated is specific to welding accomplished by a sheet explosive, the uniform instantanous contiguous surface welding may be also accomplished by magnetic bonding and capacitor discharge bonding since the latter two methods in common with the explosive sheet method provide for the uniform instantaneous contiguous surface welding herein contemplated.

In accordance with the invention the plates 2 and 3 may be composed of identical stainless steels or different stainless steels, or plate 2 may be composed of a suitable stainless steel while plate 3 may be composed of a different allow such as a platinum-rhodium alloy or a refractory metal such as titanium.

Various modifications of the invention are contemplated within the scope of the appended claims.

What is claimed is:

1. The method of making a spinnerette comprising positioning a face of a first metal plate adjacent a face of a second metal plate, mechanically securing the plates in contiguous relationship, forming a counterbore having a conical terminal in the first plate with the terminal passing through the first plate and scoring the second plate, separating the plates and forming a cylindrical capillary bore through the second plate axially of the score, smoothening the face of the second plate to the precise desired thickness, reassembling the plates with the capillary in co-axial alignment with the counterbore, and instantaneously uniformly welding substantially the entire areas of said faces to each other without plastic deformation.

2. The method of making a spinnerette according to claim 1, wherein said plates are mechanically secured by forming a co-axial bore through the plates adjacent the marginal peripheral regions thereof, and fitting a dowel into the co-axial bore.

3. The method of making a spinnerette according to claim 1 comprising placing a sheet of explosive material over an outerface of a plate, and explosively impulse welding the adjacent faces of the plates without plastic deformation of the plates.

No references cited.

GRANVILLE Y. CUSTER, JR., *Primary Examiner.*